INVENTOR.
LAWRENCE ROSENBERG
BY
Louis B. Applebaum
ATTORNEY

| LEVEL | MID-LEVEL VOLTAGE | LEVEL LIMITS | OUTPUTS CBA | REGION OF OUTPUT CBA |
|---|---|---|---|---|
| | | -∞ | | |
| 0 | -17.5 | | 0 0 0 | |
| | | -15 | | |
| 1 | -12.5 | | 0 0 1 | |
| | | -10 | | |
| 2 | -7.5 | | 0 1 1 | |
| | | -5 | | |
| 3 | -2.5 | | 0 1 0 | |
| | | 0 | | |
| 4 | 2.5 | | 1 1 0 | |
| | | 5 | | |
| 5 | 7.5 | | 1 1 1 | |
| | | 10 | | |
| 6 | 12.5 | | 1 0 1 | |
| | | 15 | | |
| 7 | 17.5 | | 1 0 0 | |
| | | ∞ | | |

Fig. 2

INVENTOR.
LAWRENCE ROSENBERG
BY
Louis B. Applebaum
ATTORNEY

Oct. 4, 1966 L. ROSENBERG 3,277,463

ENCODING CIRCUIT

Filed Sept. 16, 1959 3 Sheets-Sheet 3

INVENTOR.
LAWRENCE ROSENBERG
BY
Louis B. Applebaum
ATTORNEY

United States Patent Office 3,277,463

Patented Oct. 4, 1966

3,277,463

ENCODING CIRCUIT

Lawrence Rosenberg, Fair Lawn, N.J., assignor, by mesne assignments, to the United States of America as represented by the Secretary of the Navy Filed Sept. 16, 1959, Ser. No. 840,481
4 Claims. (Cl. 340—347)

This invention relates to encoding circuits and especially to pulse code modulation circuits which provide a binary-coded output.

Systems which provide a binary-coded output are useful in many applications. For example, they may be employed in telemetry to send back blood pressure measurements of experimental animals carried in the nose cones of rockets, or the temperature changes of the skin of the rocket, etc. The blood pressure or temperature changes are first translated into electrical analog signals and these are applied as input signals to pulse-code modulation equipment which converts them to binary-coded pulses that are transmitted to ground receiving stations. There, the binary-coded pulses are decoded to obtain the original information.

Conventional systems which provide binary-coded outputs employ matrices to encode signals in binary form. The present invention provides a binary-coded output in pulse form without utilizing a matrix. This is accomplished by the use of the proper arrangement of basic quantizing circuits in conjunction with so-called "and" gates. (A quantizing circuit is one which yields an output voltage when the instantaneous input voltage falls between two predetermined levels, no output being provided when the input level is outside the range limited by said two predetermined levels.) A number of these basic quantizing circuits are designed to have overlapping conductive ranges for input signals. The input signal is applied to all quantizing circuits simultaneously and outputs are obtained from those in whose range of limiting levels the input signal amplitude occurs. The pattern of output and no output from the quantizers is distinctive for each input level and serves to identify each level according to a preselected binary code.

Each quantizer output is applied to a different "and" gate, and the gates are simultaneously pulsed. The gates provide a binary-coded pulsed output upon being pulsed.

An object of the invention is to provide a pulsed, coded output representative of an input signal.

Another object is to provide an encoding circuit capable of providing, without the use of matrixed switch circuits, a binary-coded pulse output representative of an input signal.

Other objects and many of the attendant advantages of this invention will be readily appreciated as the same becomes better understood by reference to the following detailed description when considered in connection with the accompanying drawings wherein:

FIG. 4 is a schematic circuit diagram of component circuits which can be employed in the blocks of FIG. 1.

FIG. 1 shows, in block form, a complete quantizer and encoder for an eight-level, three-digit, reflected binary pulse-code-modulation system.

Each quantizer provides an output signal between certain input voltage limits. The table in FIG. 2 shows how the three quantizers of FIG. 1 can be set up to provide an eight-level (three-digit) reflected binary code output for an A.C. input signal of about 40 volts peak-to-peak.

The system has eight steps, or levels, from 0 to 7. Each step, or level, is represented by a different combination of binary digits according to the reflected binary code, as indicated in the column called "Outputs CBA." A "0" indicates the absence of an output signal and a "1" indicates the presence of an output signal. Thus, an input signal of −2.5 volts amplitude would be at level 3 and level 3 would be indicated by an output signal from quantizer B and absence of output signals from quantizers A and C.

Level 3 includes input signals having amplitudes between 0 and −5 volts. The overall range of input signal amplitudes and the extent of the range for each level are arbitrary and a matter of selection for specific purposes and needs.

In the particular system shown in the table, the arrows indicate the input voltage ranges within which each quantizer is conductive; thus, quantizer A(12) conducts when its input signal is between −5 and −15 volts or between 5 and 15 volts, quantizer B(14) when its input signal is between −10 and +10 volts, and quantizer C(16) when its input signal is between 0 and ∞(infinity) volts. (It will be noted that for a 40 volt peak-to-peak input signal, the level limits could be −20 to +20 volts. However, if the input signal happens to exceed these limits momentarily, the circuits would be overdriven and errors would result. It is thus better from a practical point of view to use limits for the end levels greater than any possible signal excursion. These limits are denoted here by −∞ and ∞ to put the case in its most general terms.)

Figure 3:
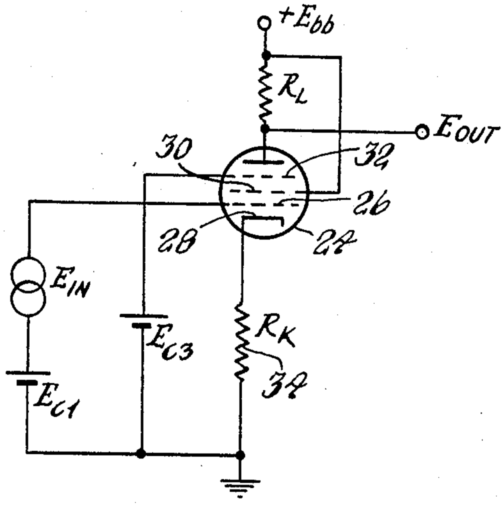
FIG. 3 is a schematic circuit diagram of a basic quantizing circuit.

The basic circuit needed for a quantizer is therefore a circuit which will be cut off until the input signal reaches a predetermined amplitude, at which time conduction will start. Conduction will continue until the input signal reaches a higher predetermined signal level, at which time conduction will cease. FIG. 3 shows a circuit which performs in this manner.

Tube 24 is a multigrid tube having at least three grids, such as a 6AS6. (The term "control element" will be defined herein to include any electrode within an electron tube which is capable of being utilized to control the electron flow, except the anode and the cathode.) When the voltage between the control grid 26 and the cathode 28 is below cut-off, there is no cathode current and hence no output. As soon as the control grid-cathode voltage rises above the cut-off value, the tube conducts. Cathode current flowing through the cathode resistor 34 raises the cathode potential above ground. As the voltage across the cathode resistor 34 increases, the voltage between the cathode 28 and the suppressor grid 32 increases in such direction as to drive the suppressor grid 32 to its cut-off value. At this point, plate current ceases, all current flowing to the screen grid 30, and the output from the tube drops to zero again.

The operating range of this basic circuit can be determined in the following way:

Let $E_{g10}$ be the cut-off voltage of the control grid, $g_1$, of the quantizer tube and $E_{g30}$ be the cut-off voltage of grid, $g_3$, of the tube. If $E_1$ is the lower limit of input voltage at which plate current starts to flow, then with respect to FIGURE 1, $$E_1+E_{c1}=-E_{g10}$$
$$E_1=-(E_{c1}+E_{g10})$$

$E_{c1}$=Control grid bias

If $E_2$ is the upper limit of input voltage at which plate current stops flowing because grid, $g_3$, is cut off, then, assuming a cathode follower gain of unity, $$E_2+E_{c1}=Ek \text{ (cathode voltage to ground)}$$

However, $Ek=E_{c3}+E_{g30}$ $$E_{c3}=\text{bias of } g_3$$

Therefore, $$E_2+E_{c1}=E_{c3}+E_{g30}$$

or $$E_2=E_{c3}-E_1+E_{g30}$$

Since $E_1=-(E_{c1}+E_{g10})$.

The range of plate current flow $$\Delta Ein=E_2-E_1=E_{c3}-E_{c1}+E_{g30}+E_{c1}+E_{g10}$$
$$\Delta Ein=E_{c3}+E_{g30}+E_{g10}$$

Figure 1:
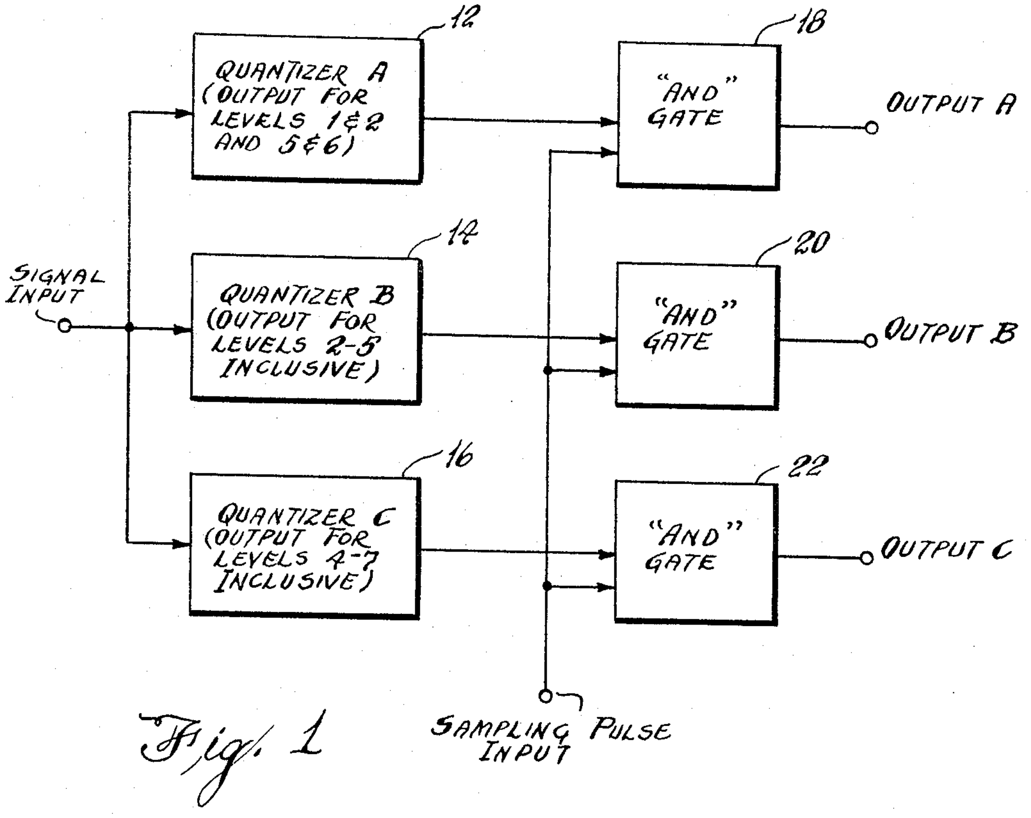
FIG. 1 is a block diagram of an eight-level three-digit encoder, showing a preferred embodiment of the invention.
Figure 2:
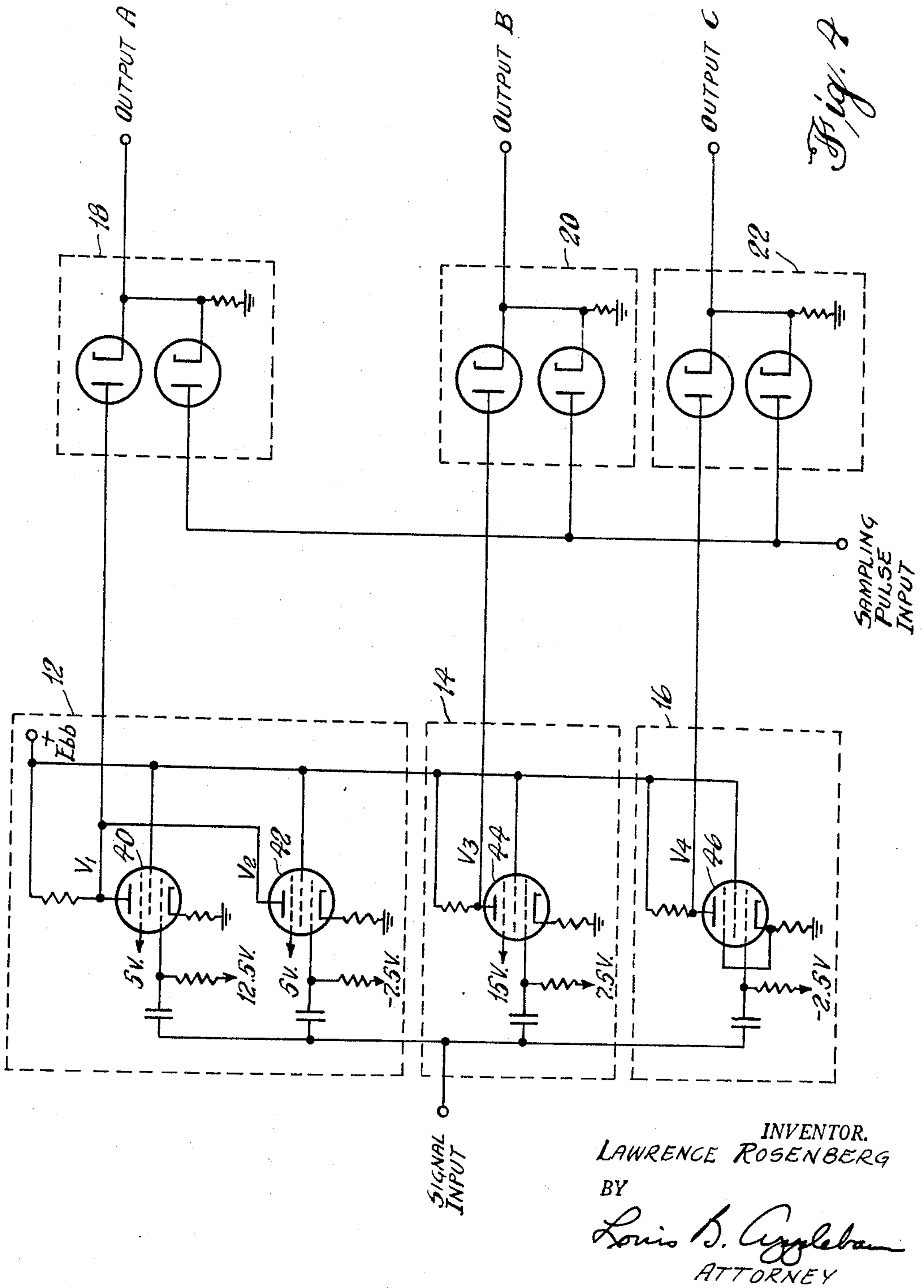
FIG. 2 is a table illustrating characteristics of an eight-level, reflected binary code system for which the components of the encoder of FIG. 1 can be designed.

The transfer characteristics of the circuit of FIGURE 1 are shown in FIGURE 2 for the condition for zero bias voltages ($E_{c1}=E_{c3}=0$).

$$E_1=-E_{g10}$$
$$E_2=E_{g30}$$
$$\Delta E=E_{g30}+E_{g10}$$

Now, to design such a circuit for a range of 10 volts, for example from −15 to −5 volts as in quantizer A, let it be assumed that:

$$E_{g10}=E_{g30}=2.5 \text{ volts}$$

Since $$E_1=-E_{c1}-E_{g10}$$
$$E_{c1}=-E_1-E_{g10}=-(-15)-2.5$$
$$E_{c1}=15-2.5=12.5 \text{ volts}$$

Also, $$E_2=E_{c3}-E_{c1}+E_{g30}$$
$$E_{c3}=E_2+E_{c1}-E_{g30}$$
$$E_{c3}=-5+12.5-2.5$$
$$E_{c3}=5 \text{ volts}$$

Checking, $$\Delta Ein=E_{c3}+E_{g30}+E_{g10}$$
$$=5+2.5+2.5=10 \text{ volts}$$

FIG. 4 illustrates how several of the basic quantizing circuit of FIG. 3 can be combined to provide the quantizers A, B and C (12, 14 and 16) of the pulse code modulation system shown in block form in FIG. 1 and having the characteristics indicated in the table of FIG. 2. The combination is straightforward except that two of the basic circuits are used in quantizer A(12). Tube 40 operates on input signals ranging between −15 and −5 volts, and tube 42 on signals between 5 and 15 volts.

The number of quantizer output leads, in this case three, which are required in any given case is determined by the number of levels into which the input signal is to be resolved. The signal conditions on each output lead are two in number (presence or absence of signal). The number "two" must be raised to the third power to obtain the number "eight," that is, the number of levels desired here. Therefore, three output leads are required. Another way of stating this is that there are eight possible permutations of two conditions taken three at a time. If it were necessary to resolve the output signal into any number of levels from nine to sixteen, four output leads would be required since the possible permutations of two conditions taken four at a time is sixteen ($2^4=16$).

The "and" gates (18, 20 and 22) shown are conventional circuits. An output is provided by each one when a sampling pulse and an input signal from its associated quantizer are simultaneously applied to the "and" gate inputs.

The sampling pulses employed are negative-going pulses extending negatively from a base line of $+E_{bb}$ volts because the quantizer output signals are also negative-going signals from a base of $+E_{bb}$ volts. The amplitude of the sampling pulse (as measured from the $+E_{bb}$ volts base line) must be greater than the maximum negative-going amplitude of any of the quantizer output signals in order for the "and" gate output signal amplitudes to be equal to their respective quantizer output amplitudes.

It is, of course, apparent that the higher the frequency of the input signal, the higher the pulsing frequency must be to provide an adequate representation of the input signal waveform. In other words, as the interval between samplings is decreased, the correspondence between output and input waveshapes is improved.

Also, as the range of input voltages within which each quantizer operates is decreased, the resolution of the encoder is improved, that is, the more nearly the output signal will show the exact value of the input signal.

Obviously many modifications and variations of the present invention are possible in the light of the above teachings. It is therefore to be understood that within the scope of the appended claims the invention may be practiced otherwise than as specifically described.

I claim:

1. A device for resolving a selected characteristic of an input signal into a predetermined number of levels and producing a binary-coded output representative of the level of said input signal at any selected time comprising, in combination:

a plurality of quantizing means, each having a unidirectional current device with at least three control elements for producing an output signal over a predetermined range of values of said selected characteristic of said input signal, the range of each quantizing means being different from that of the others, each quantizing means being biased independently of the others and producing its output independently of the others, the number of quantizing means being such that the number of permutations of the conditions of presence or absence of output signal from each of said quantizing means is equal to the desired number of levels into which the values of said selected characteristic are to be resolved;

means to apply the input signal to all said quantizing means simultaneously;

a plurality of output leads, each being connected to a different one, and only one, of said quantizing means; and means for simultaneously sampling the conditions of the output signals on said leads.

2. A device for resolving a selected characteristic of an input signal into a predetermined number of levels and producing a binary-coded pulse output representative of the level of said input signal at any selected time comprising, in combination:

a plurality of quantizing means, each having a unidirectional current device with at least three control elements for producing an output signal over a predetermined range of values of said selected characteristic of said input signal, the range of each quantizing means being different from that of the others, each quantizing means being biased independently of the others and producing its output independently of the others, the number of quantizing means being such that the number of permutations of the conditions of presence or absence of output signal from each of said quantizing means is equal to the desired number of levels into which the values of said selected characteristics are to be resolved;

means to apply the input signal to all said quantizing means simultaneously;

a plurality of output leads, each being connected to a different one, and only one, of said quantizing means; and pulse means for simultaneously sampling the conditions of the output signals on said leads and producing pulse signals in accordance therewith.

3. An encoding device for resolving the amplitude values of an input signal into a predetermined number of levels and producing a binary-coded pulse output representative of the level of said input signal at any selected time comprising, in combination;

a plurality of quantizing means, each having a unidirectional current device with at least three control elements and being biased to produce an output signal for a predetermined number of input signal levels, the groups of levels covered by each quantizing means being different, each quantizing means being biased independently and producing its output independently of the others, the number of said quantizing means being such that the number of permutations of the conditions of presence or absence of output signals from said quantizing means is equal to the desired number of levels into which said input signal amplitude values are to be resolved;

means to apply the input signal to all quantizing means simultaneously;

a plurality of output leads, each being connected to a different one, and only one, of said quantizing means; and pulse means for simultaneously sampling the conditions of the output signals of said leads and producing pulse signals in accordance therewith.

4. A device as set forth in claim 3, wherein said pulse means includes a plurality of "and" gates, each one connected to a different one of said output leads and connections for simultaneously applying a sampling pulse to all said "and" gates, simultaneous application of a sampling pulse and an output from a quantizing means to any "and" gate resulting in a pulse output from that "and" gate.

References Cited by the Examiner

UNITED STATES PATENTS

| | | | |
|---|---|---|---|
| 2,453,454 | 11/1948 | Norwine | 328—150 |
| 2,486,391 | 11/1949 | Cunningham | 340—347.1 |
| 2,529,666 | 11/1950 | Sands | 328—117 |
| 2,552,619 | 5/1951 | Carbery | 179—15.6 |
| 2,612,550 | 9/1952 | Jacobi | 328—14 |
| 2,636,983 | 4/1953 | Poole | 328—116 |
| 2,733,410 | 1/1956 | Goodall | 332—11 |
| 2,840,806 | 6/1958 | Bateman. | |
| 2,860,242 | 11/1958 | Test | 328—117 |

MAYNARD R. WILBUR, *Primary Examiner.*

K. CLAFFY, C. L. JUSTUS, F. M. STRADER, *Examiners.*

A. L. NEWMAN, *Assistant Examiner.*